(12) United States Patent
Tezuka et al.

(10) Patent No.: US 7,686,548 B2
(45) Date of Patent: Mar. 30, 2010

(54) MACHINE TOOL

(75) Inventors: Hiroki Tezuka, Yamanashi (JP); Naoki Sato, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 175 days.

(21) Appl. No.: 12/017,037

(22) Filed: Jan. 20, 2008

(65) Prior Publication Data

US 2008/0267723 A1    Oct. 30, 2008

(30) Foreign Application Priority Data

Jan. 29, 2007    (JP)    ............................. 2007-018122

(51) Int. Cl.
  *B23Q 11/08*    (2006.01)
  *B23C 9/00*    (2006.01)
(52) U.S. Cl. .......................................... 409/137; 82/52
(58) Field of Classification Search ................ 407/11; 409/134, 136, 137; 82/50, 52
See application file for complete search history.

(56) References Cited

U.S. PATENT DOCUMENTS

| 2,714,926 | A | * | 8/1955 | Nichta | .......................... 160/191 |
| 4,955,770 | A | * | 9/1990 | Kitamura | ..................... 409/134 |
| 5,178,499 | A | * | 1/1993 | Umeda et al. | ................ 409/134 |
| 6,120,222 | A | * | 9/2000 | Hiramoto et al. | ............. 409/134 |
| 6,641,341 | B2 | * | 11/2003 | Sato et al. | .................... 409/137 |
| 7,128,505 | B2 | * | 10/2006 | Sato et al. | .................... 409/136 |
| 2004/0031364 | A1 | * | 2/2004 | Sato et al. | ....................... 83/98 |

FOREIGN PATENT DOCUMENTS

| JP | 60-175541 U | 11/1985 |
| JP | 61-004644 A | 1/1986 |
| JP | 2-35634 U | 3/1990 |
| JP | 10-180585 A | 7/1998 |
| JP | 10180585 | 7/1998 |
| JP | 2001-087964 A | 4/2001 |
| JP | 2001162488 | 6/2001 |
| JP | 2001269836 | 10/2001 |
| JP | 2002-326137 A | 11/2002 |
| WO | 03/031116 A2 | 4/2003 |

OTHER PUBLICATIONS

EP Search Report for 08150531.5 dated March 25, 2008.
Notice of Reasons for Rejection for JP 2007-018122 mailed July 8, 2008.

* cited by examiner

*Primary Examiner*—Will Fridie, Jr.
(74) *Attorney, Agent, or Firm*—Lowe Hauptman Ham & Berner LLP

(57) ABSTRACT

A machine tool capable of removing chips from the machine with a simple structure. A continuous groove is formed at the lowest position of a splash guard surrounding a bed so as to extend from a rear end of the machine along one side portion, a front portion and the other side portion of the bed. Machining fluid brought into the groove from a coolant tank flows along the groove and is recovered into the coolant tank. A bottom of the groove has a continuous slope such that an inlet side where the machining fluid is brought in through the discharge port is highest (or the groove is shallowest) and a discharge side for the coolant tank is lowest (or the groove is deepest). The chips dropped in the groove are discharged together with the machining fluid into the coolant tank where the chips and the machining fluid are separated.

8 Claims, 2 Drawing Sheets

MACHINE TOOL

RELATED APPLICATIONS

The present application is based on, and claims priority from, Japanese Application Number 2007-018122, filed Jan. 29, 2007, the disclosure of which is hereby incorporated by reference herein in its entirety.

BACKGROUND OF THE INVENTION

1. Field of the Invention

The present invention relates to a machine tool, and more particularly to removal of chips produced in the machine tool by machining a workpiece.

2. Description of the Related Art

In a machine tool, large amounts of chips are produced and deposited inside a splash guard when a workpiece is machined by means of a tool. If the deposited chips are left as they are, they may hinder the operations of drive systems for a table, saddle, etc. or retard the flow of machining fluid (coolant). It is necessary, therefore, to efficiently discharge the chips from the machine lest they deposit, so that various methods are proposed for chip discharge.

Roughly, there are two types of methods for discharging the chips from the machine.

A method in which the chips are discharged from the machine by means of a chip conveyor or the like.

A method in which the chips are discharged from the machine with cutting fluid (machining fluid).

As an example of the former method, there is known a method in which a through groove is provided under a machining region, for example, the conveyor is housed in the through groove, and the chips produced by machining are guided onto the conveyor in the through groove and discharged from the machine by the conveyor (see JP 60-175541U, JP 10-180585A and 2002-326137A).

As the latter method in which the chips are discharged from the machine with the cutting fluid, there is conventionally known an example such as the one shown in FIGS. 2a and 2b. The prior art example shown in FIGS. 2a and 2b is a case that is applied to a machining center.

FIG. 2a is a front view, and FIG. 2b is a schematic sectional view taken along line A-A of FIG. 2a without illustration of a table, a guide mechanism, etc.

A table 7 is set on the bed 3 with a guide mechanism 6 between them. A column 8 for supporting a spindle 9 is disposed behind the bed 3. A splash guard 1 is provided covering the front part and two opposite side parts of the bed 3. The splash guard 1 has a bottom portion, from which the bed 3 protrudes upward. Specifically, the splash guard 1 is constructed in a manner such that its bottom portion is formed in close contact with the front part and the two side parts of the projecting bed 3 and that a vertical wall portion is then formed continuously with the bottom portion. At the bottom portion of the splash guard 1 that surrounds the bed 3, a groove 2 is formed extending continuously along its front part and two side parts. A bottom portion of this groove is formed having a downward slope such that it is higher at the front part of the machine than at the rear part. The wall portion of the splash guard 1 that is continuous with the groove 2 is inclined toward the groove.

Further, pipes 5 are arranged extending from a coolant tank 4 at the rear part of the machine to the front part, and nozzles 5a are attached individually to the respective distal ends of the pipes. The cutting fluid (coolant) that is drawn from the coolant tank 4 by a pump (not shown) flows through the pipes 5 and is jetted out from the nozzles 5a toward the groove 2. The cutting fluid flows along the groove 2, as indicated by arrows Q, and is recovered into the coolant tank 4.

In cutting the workpiece set on the table 7 by means of the tool mounted on the spindle 9, the cutting fluid (coolant) drawn from the coolant tank 4 by a pump (not shown) is jetted out from a nozzle (not shown) into a machining region, whereby the chips are guided into the groove 2. The chips that are dropped into the groove 2 are spouted from the nozzles 5a, swept away into the coolant tank 4 by the cutting fluid that flows along the slope of the bottom portion of the groove 2 from the front part toward the rear part, as indicated by the arrows Q, and separated from the cutting fluid.

Besides the example shown in FIGS. 2a and 2b, there is another known method in which chips are discharged from the machine with cutting fluid (see JP 2-35634U and JP 2001-87964A). In this method, a bed on which a table is set is provided with a hole, chips that are produced as a workpiece mounted on the table is machined are guided into the hole by cutting fluid and dropped downward, and the dropped chips are taken out manually or by means of a conveyor.

According to the above method in which the chips are discharged from the machine by means of the chip conveyor or the like, however, the chip conveyor or some other discharge means must be provided only for chip discharge, thus entailing an increase in cost. Further, there is a problem that a small machine tool cannot secure an internal space in which the conveyor or the like can be set.

On the other hand, the latter method in which the chips are removed with only the cutting fluid requires a pump, pipes, hoses, etc. as essential parts, so that it is also advantageous in installation space. In the prior art example shown in FIGS. 2a and 2b, however, the pipes must be set extending up to the front part of the machine in order to run the cutting fluid from the front part, so that the interior of the machine is complicated, and the pipes sometimes may constitute starting points for undesirable chip deposits.

According to the method in which the chips are removed by being dropped into the hole in the bed, on the other hand, the hole must be bored in the bed, and some means is required to recover the chips that are dropped under the bed.

SUMMARY OF THE INVENTION

The present invention provides a machine tool equipped with chip discharge means having a simple structure and capable of discharging chips from the machine effectively.

A machine tool of the present invention performs machining in a machining region by moving a tool attached to a spindle and a workpiece mounted on a table relatively to each other. The machine tool comprises: a splash guard covering at least at a front and both sides of the machine tool; a continuous groove formed along a front and both sides of the machining region at the lowest position in a region covered by the splash guard, a bottom surface of the continuous groove being inclined such that one rear end thereof on one side of the machining region is highest and the other rear end thereof on the other side of the machining region is lowest; and machining fluid supply means that supplies machining fluid to the continuous groove from the one rear end thereof.

The splash guard may have a bottom part from which a bed of the table stands, and the continuous groove may be formed in the bottom part along a periphery of the bed of the table.

With a simply configuration of providing the inclined groove around the machining region and supplying machining fluid into the groove, chips can be discharged outside the machine and that chip discharge means can be obtained at low cost.

DETAILED DESCRIPTION

Figure 1A:
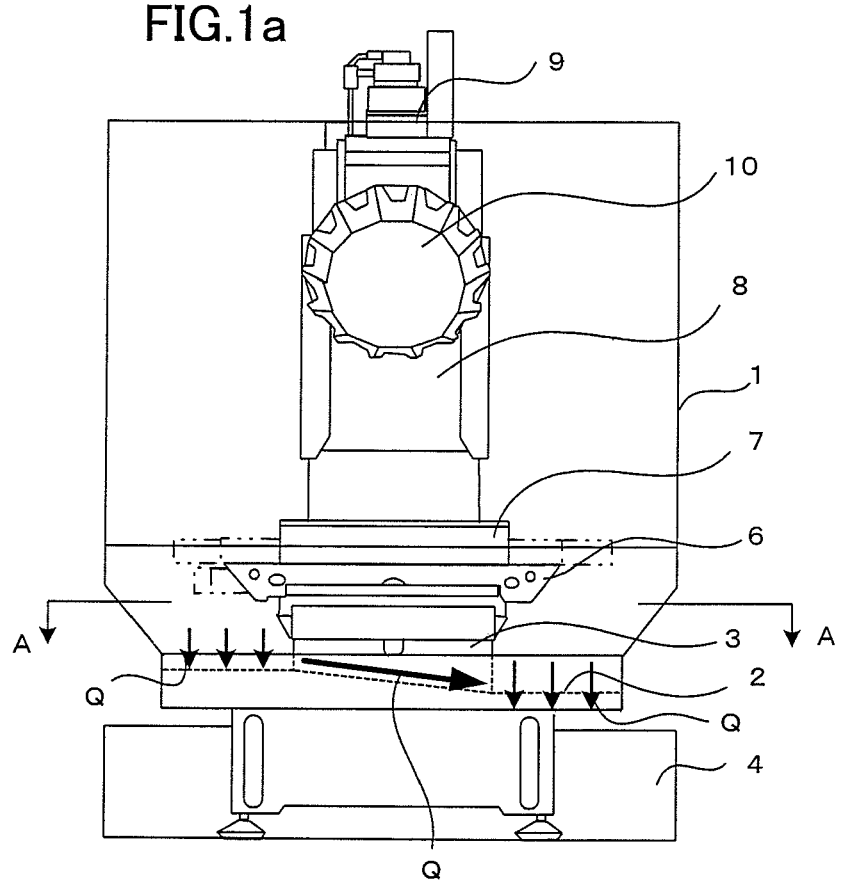
FIGS. 1a and 1b are schematic views showing one embodiment of the present invention.
Figure 1B:
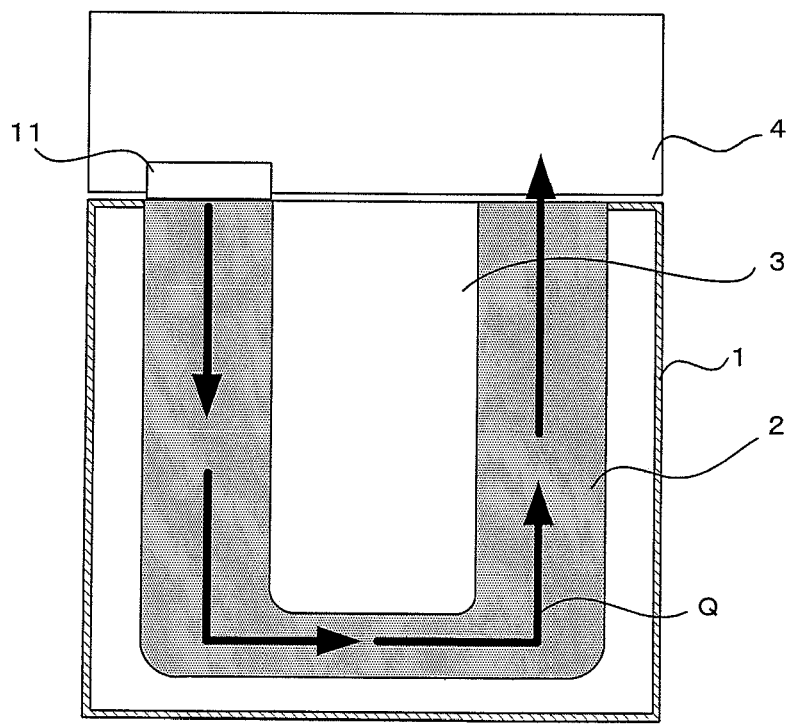

FIGS. 1a and 1b are schematic views showing one embodiment of the present invention. This embodiment is an example of a machining center. FIG. 1a is a front view, and FIG. 1b is a schematic sectional view taken along line A-A of FIG. 1a without illustration of a guide mechanism, a table, etc.

Figure 2A:
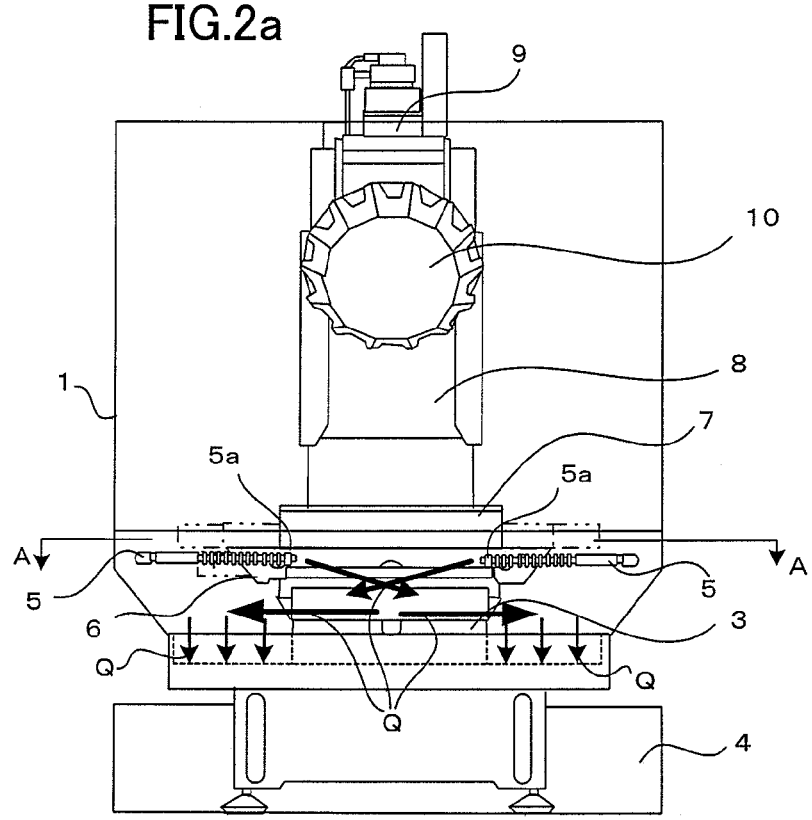
FIGS. 2a and 2b are schematic views showing an example of a prior art machine tool provided with a chip discharge mechanism.
Figure 2B:
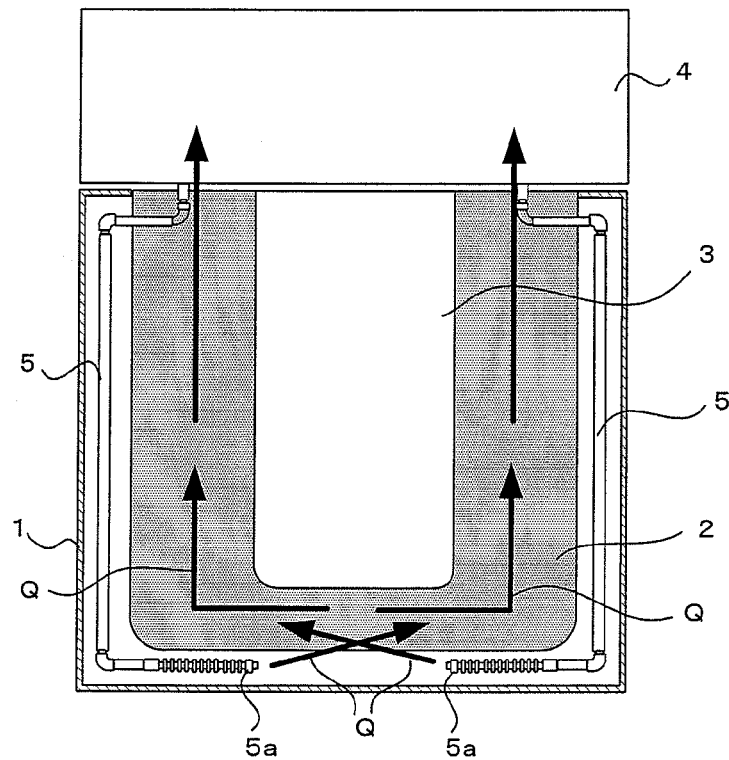

This embodiment differs from the prior art example shown in FIGS. 2a and 2b in the structure of a groove and the direction in which machining fluid flows in the groove and in that piping for the machining fluid supply to the groove does not extend up to the front part. Like numerals are used to designate common members of this embodiment and the prior art example shown in FIGS. 2a and 2b.

A table 7 is set on the bed 3 with a guide mechanism 6 between them. A column 8 for supporting a spindle 9 is disposed behind the bed 3. A splash guard 1 is provided covering the front part and two opposite side parts of the bed 3. The splash guard 1 has a bottom portion, from which the bed 3 protrudes upward. Specifically, the bottom portion of the splash guard is formed in close contact with the front part and the two side parts of the projecting bed 3, and a wall portion is formed vertically extending from the bottom portion. At the bottom portion of the splash guard 1 around the bed 3, a continuous groove 2 for chip discharge guidance is provided so as to substantially encircle the bed.

The groove 2 is formed along the front portion and two side portions of the bed 3. This groove 2 is constructed to have a continuous slope such that its bottom portion at one rear end on one side of the machining region (a groove end on the left-hand side of the bed 3 in FIG. 1b) is highest (or the groove is shallowest) and its bottom portion at the other rear end on the other side of the machining region (a groove end on the right-hand side of the bed 3 in FIG. 1b) is lowest (or the groove is deepest). Specifically, a front groove for chip discharge is provided at the bottom portion of a front part of the splash guard 1, and side grooves for chip discharge are provided individually at the respective bottom portions of two side parts. The front groove is connected to the two side grooves. One side groove (left-hand groove in FIG. 1b) has a slope inclined downward from the rear part of the machine toward a part that connects with the front groove. The front groove has a slope inclined downward from a part that connects with the one side groove to a part that connects with the other side groove. The other side groove is inclined downward from a part that connects with the front groove toward the rear part of the machine tool.

A discharge port 11 is located at an end portion of the groove 2 at the rear part of the machine where the bottom portion of the groove is highest. Machining fluid (coolant) that is drawn from a coolant tank 4 by a pump (not shown) is discharged through the discharge port 11. The machining fluid discharged through the discharge port 11 flows along the slope of the groove 2 and around the head 3, as indicated by arrows Q. The wall portion of the splash guard 1 adjoining the bottom portion that defines the groove 2 is inclined toward and connected to the groove 2. Thus, the machining fluid and chips that are spattered up to the wall portion of the splash guard 1 can be quickly guided to the groove.

In cutting the workpiece set on the table 7 by means of a tool mounted on the spindle 9, the machining fluid (coolant) drawn from the coolant tank 4 with a nozzle (not shown) is jetted out into a machining region. This machining fluid removes the chips from the machining region and flows down together with the chips. Further, the spattered machining fluid and chips hit the wall portion of the splash guard 1 and flow down to be guided into the groove 2.

On the other hand, the machining fluid that is drawn from the coolant tank 4 by the pump (not shown) and jetted out through the discharge port 11 flows along the slope of the groove 2, as indicated by the arrows Q, sweeps away the chips that are guided into the groove 2, and flows out into the coolant tank 4 through an outlet of the groove 2. Thereafter, the chips and the machining fluid are separated.

As described above, the groove 2 is located so as to surround the tool on the bed 3 and the machining region for the workpiece, and the bottom portion of the groove 2 is continuously inclined from the one end portion to the other. When the machining fluid is supplied to the groove 2 through its end portion at which its bottom portion is higher, it flows along the slope of the groove 2 and is recovered into the coolant tank 4. The chips that are produced as the workpiece is machined by the tool drop into the groove 2 that surrounds the machining region and are swept away and conveyed up to the coolant tank 4 by the machining fluid that flows in the groove 2. Then, the machining fluid and the chips are separated in the position of the coolant tank 4.

In the embodiment described above, the groove 2 is formed in the bottom portion of the splash guard 1 (the groove is defined by the splash guard 1 only or by the splash guard 1 and a surface of the head). Although the splash guard 1 used has the groove 2 formed in its bottom portion, a groove may be formed in the bed itself so as to surround the machining region without forming any groove in the bottom portion of the splash guard 1. Alternatively, moreover, a bottom member may be provided having a groove formed therein such that a splash guard is located around the groove.

What is claimed is:

1. A machine tool for performing machining in a machining region by moving a tool attached to a spindle and a workpiece mounted on a table relatively to each other, comprising:

a splash guard comprising a bottom portion;

a groove formed in the bottom portion of the splash guard along a front and opposing sides of said machining region, a bottom surface of said groove being inclined such that the bottom surface of said groove is at its highest at the rear end of one side of the machining region and the bottom surface of said groove is at its lowest at the rear end of the other side of the machining region; and machining fluid supply means that supplies machining fluid to said groove from the one rear end thereof.

2. The machine tool according to claim 1, further comprising:

a bed on which the table is set, the bed having a front part and two side parts, the bed protruding upward from the bottom portion of the splash guard, wherein said splash guard is formed in close contact with the front part and the two side parts of the bed, and said groove is formed along a periphery of the bed.

3. The machine tool according to claim 1, wherein the machining fluid supply means further comprises a discharge port located at an end portion of the groove at the rear end of the side of the machining region where the bottom surface of the groove is at its highest.

4. The machine tool according to claim 1, further comprising a nozzle for supplying the machining fluid to the machining region.

5. A machining center for performing machining in a machining region, comprising:

a splash guard having a bottom portion;

a bed protruding upward from the bottom portion of the splash guard, the bed has a front part and two side parts, wherein said splash guard is formed in close contact with the front part and the two side parts of the bed;

a continuously inclined groove formed in the bottom portion of the splash guard and along the front part and the two side parts of the bed, the continuously inclined groove has a first end portion and a second end portion, wherein a bottom surface of the continuously inclined groove at the first end portion is higher than the bottom surface at the second end portion; and a discharge port located at the first end portion to discharge machine fluid.

6. The machining center according to claim 5, further comprising a nozzle for supplying the machining fluid to the machining region.

7. The machining center according to claim 5, wherein the splash guard is provided to cover the front part and the two side parts of the bed.

8. The machining center according to claim 5, further comprising a spindle and a tool being mounted on the spindle.

* * * * *